April 21, 1953  H. PETERS  2,635,975
METHOD OF BONDING POLYETHYLENE TO VULCANIZED
RUBBER AND ARTICLE PRODUCED THEREBY
Filed Feb. 27, 1951
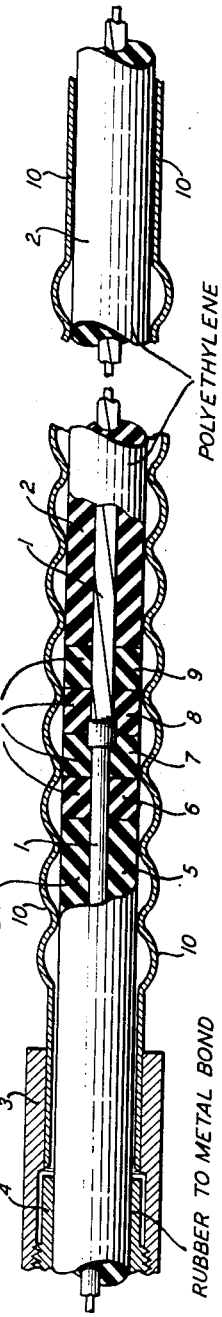
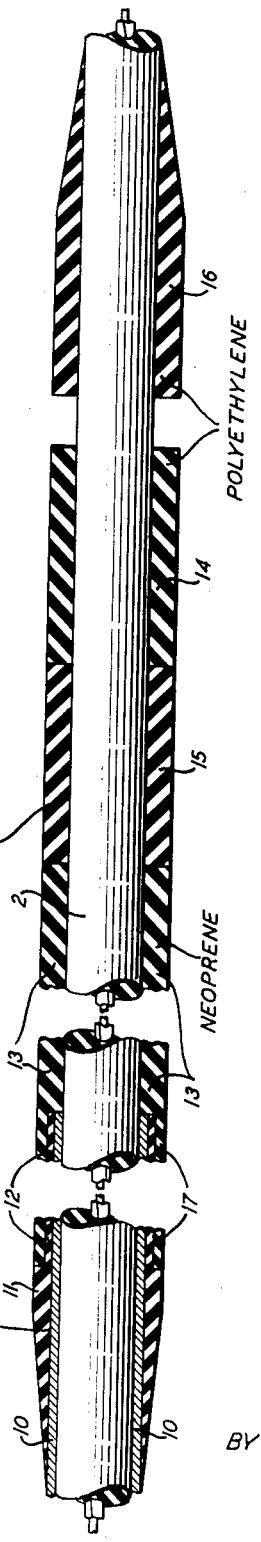
INVENTOR
H. PETERS
BY Edwin B. Cave
ATTORNEY

UNITED STATES PATENT OFFICE 2,635,975

METHOD OF BONDING POLYETHYLENE TO VULCANIZED RUBBER AND ARTICLE PRODUCED THEREBY

Henry Peters, Summit, N. J., assignor to Bell Telephone Laboratories, Incorporated, New York, N. Y., a corporation of New York Application February 27, 1951, Serial No. 212,998

19 Claims. (Cl. 154—130)

This invention relates to methods of bonding polyethylene bodies to bodies of natural or synthetic rubber and to bonded articles so produced. The invention also relates to methods of bonding polyethylene bodies to metal bodies by means of intermediate bodies of natural or synthetic rubber and to bonded articles so produced.

The mechanical and electrical properties of the solid polymers of ethylene, referred to as polyethylene, have led to their widespread use for electrical insulation and protective coverings in wires and cable and for numerous other purposes. It is often desirable, particularly in these electrical uses, to form a strong physical bond between the polyethylene and a rubber, natural or synthetic, as when a splice is made between a polyethylene insulated or sheathed cable and a rubber insulated or jacketed cable. However, up to the time of the present invention, no means has been available to form such a bond since polyethylene will not form a strong bond directly to any of the rubbers.

Similarly, polyethylene will not form a strong and permanent bond to metal bodies. Such a bond is often required in the termination of polyethylene insulated or sheathed cable or in other structures.

The present invention represents a solution to both these problems. The bonding of polyethylene to any of the rubbers is accomplished, according to the present invention, by the use of special techniques applied to one or more intermediate layers or bodies of polyethylene-rubber mixtures.

The insertion, between the polyethylene and the rubber, of a single layer containing only a mixture of polyethylene and rubber will not lead to the formation of a strong or permanent bond regardless of the proportions of polyethylene and rubber in the mixture. It has been found, however, that the addition of an acid carbon black to the mixture in the proper manner will cause the formation of a strong, permanent bond upon heating. This use of an intermediate layer containing an acid carbon black constitutes the simplest and most effective technique for securing a bond according to the present invention.

However, in those instances where the bond is being formed between polyethylene and rubber used as electrical insulation directly over a conductor, the use of a bonding layer which has had its electrical resistivity reduced by the addition of carbon black may not be suitable. It has been found that, where the carbon black is omitted, a suitable bond can be formed by using a plurality (at least three and preferably at least four) of intermediate layers of polyethylene-rubber mixtures of graded composition. Even when a plurality of layers of graded composition are employed, the bond can be improved by the addition of carbon black if its presence can be tolerated from an electrical standpoint.

The formation of a polyethylene to rubber bond by these techniques can be used as a means for forming a bond of polyethylene to metal since the rubber which is bonded to polyethylene can also be bonded to metal by known procedures.

An illustration of the application of the present invention to the bonding of polyethylene to rubber and, through the rubber, to metal in a submarine cable is shown in the accompanying drawing in which:

Fig. 1 is a front elevation, in section, of a portion of a submarine cable, with its outer protective coverings absent, in which polyethylene is bonded to a rubber, and through the rubber to a metal body, by means of a plurality of intermediate layers; and Fig. 2 is a front elevation, in section, of a different portion of the same submarine cable in which polyethylene is bonded to a rubber, and through the rubber to a metal body, by means of a single intermediate layer containing carbon black.

These figures show portions of a submarine cable in which vacuum tube repeaters are incorporated as a part of the submerged cable structure. The primary conductor of the cable is a central metal core assembly 1, which is covered with an insulating layer. In the main body of the cable, this insulating layer is a cylindrical covering of polyethylene 2.

The vacuum tube repeater (not shown) is enclosed in a metal housing (not shown). It is essential that this repeater be protected from the entrance of moisture. For this reason a succession of moisture-proof barriers are provided to seal the repeater housing. To provide certain of these barriers, it is necessary to provide a strong, permanent, moisture-proof bond between the polyethylene insulation and the metal repeater housing.

The first such bond is shown in Fig. 1. A cylindrical metal sleeve member 3, a portion of which is shown in Fig. 1, is fastened through intermediate metal members (not shown) to the repeater housing. A second cylindrical sleeve member 4, conveniently formed of brass, is mounted within the sleeve 3 by means of a screw thread and forms the direct bond with the cable insulation.

This bonding is accomplished by forming the cable insulation, in the vicinity of the sleeve 4, of a covering of a rubber composition 5, in place of polyethylene. Suitable rubber compositions for bonding to brass are known in the art. A typical composition is the following:

| | Parts by weight |
|---|---|
| Crude natural rubber | 100 |
| Sulfur | 3 |
| Zinc oxide | 50 |
| Stearic acid | 0.5 |
| Mercaptobenzothiazole | 0.5 |
| Petrolatum | 5 |
| Aldol-α-naphthylamine | 1 |

The rubber covering 5 is bonded to the polyethylene covering 2 by a plurality of intermediate sections 6, 7, 8, 9 formed of mixtures of rubber and polyethylene in graded proportions. In the bond shown in Fig. 1, four intermediate bonding sections are used.

The bonding section 6, which is in contact with the rubber covering, is made up of a mixture consisting of 60 parts of natural rubber and 40 parts polyethylene. Section 7 is made up of 50 parts of natural rubber and 50 parts of polyethylene; section 8 is made up of 40 parts of natural rubber and 60 parts of polyethylene. Section 9, which is in contact with the polyethylene covering is made up of 30 parts of natural rubber and 70 parts of polyethylene.

When the rubber composition is vulcanized in contact with the adjacent polyethylene-rubber mixture, apparently some of the sulfur migrates from the rubber composition into the surface of the mixture and causes the formation of a strong vulcanized bond. The intermediate sections bond autogenously together and to the polyethylene by the simple adhesion of the thermoplastic ingredients with the application of heat.

In order to insure the formation of a good bond, the polyethylene-rubber mixture adjacent to the rubber composition should not contain less than 55 per cent, and preferably not less than 60 per cent by weight of rubber. The polyethylene-rubber mixture adjacent to the polyethylene insulating covering 2 should not contain less than 50 per cent polyethylene and preferably not less than 60 per cent polyethylene. Adjacent bodies of polyethylene-rubber mixtures should differ from one another in content of either polyethylene or rubber by not more than 15 per cent by weight, and preferably not more than 10 per cent by weight.

At least three bodies of graded polyethylene-rubber mixtures should be used between the rubber composition and the polyethylene so as to insure a good bond. Best results consistent with simplicity are obtained with four intermediate graded compositions. A larger number may be used if desired.

In order to secure a good bond between the rubber composition and the adjacent polyethylene-rubber mixture, it is necessary that they be vulcanized together, as in a cylindrical mold. The remaining bodies of polyethylene-rubber mixture can be bonded together and to the polyethylene insulation at the same time or this bonding can be carried out subsequently if desired.

The bond between the rubber composition and the sleeve 4 is best formed after the rubber composition has been partially vulcanized to a state in which it will maintain its shape. To accomplish this, the unvulcanized rubber composition is placed in the mold together with the adjacent body of polyethylene-rubber mixture and the two compositions are heated under pressure until the rubber composition is sufficiently vulcanized so that it cannot be permanently deformed but still has a substantial residual vulcanizing capacity. In this partially vulcanized state, the rubber composition can more readily be inserted in the brass sleeve 4. After its insertion in the sleeve, it can be subjected to complete vulcanization and during this procedure it becomes firmly bonded to the inner surface of the sleeve.

With the rubber composition described above, the partial vulcanization can be accomplished by heating at about 290° F. for about ten minutes. After the partially vulcanized composition has been inserted in the brass sleeve, the vulcanization can be completed by heating at about 290° F. for an additional thirty minutes.

Alternatively, by using a proper mold, the bond can be formed between the rubber composition and the brass sleeve by a single vulcanizing step, with the composition being inserted into the sleeve in the unvulcanized state. The composition is then completely vulcanized, forming a bond with both the brass sleeve and the adjacent polyethylene-rubber mixture.

The addition of carbon black of the proper type, and in the proper manner, to the polyethylene-rubber mixture adjacent to the rubber composition will increase the range of rubber to polyethylene ratio which can be used in the mixture and still give a satisfactory bond. The presence of carbon black in a polyethylene-rubber mixture makes it possible to form a bond with a vulcanizable rubber composition when the rubber content of the mixture is as low as 30 per cent by weight of the total polyethylene and rubber.

Thus, where carbon black is not objectionable from an electrical standpoint, it can be added to all of the intermediate polyethylene-rubber mixtures or to only the polyethylene-rubber body which is adjacent to the vulcanizable rubber composition and, since the amount of rubber required in the latter polyethylene-rubber mixture is reduced, it is possible, where desired, to secure a satisfactory bond using only two, or only one, intermediate bonding compositions between the polyethylene body and the vulcanizable rubber body.

Such a bond formed with a single intermediate layer of a polyethylene-rubber mixture containing carbon black is shown in Fig. 2. The section of cable shown in Fig. 2 shows the second seal between the polyethylene insulation and an element which is in turn sealed to the repeater housing referred to above.

Referring back to Fig. 1, the outer sleeve 3, which is fastened to the repeater housing, is also bonded, as by brazing, to a cylindrical copper core tube 10 surrounding the insulating coverings 2, 5, 6, 7, 8 and 9. This core tube provides mechanical protection to relieve the stress on the repeater and also, by increasing the path which must be traveled by any moisture penetrating the outer seal, reduces the danger of entry of moisture into the repeater housing. The core tube is corrugated in the vicinity of the first seal referred to above and terminates in the form of a simple cylinder. The space between the core tube and the insulations 2 and 5 is filled with viscous liquid polyisobutylene. The entire core tube may conveniently have a length of the order of one hundred times its diameter.

In Fig. 2 is shown the elements used in making the seal between the outer end of the core tube 10 and the polyethylene insulating layer 2, certain of the elements being shown in the position which they occupy prior to being slipped into final sealing position. A cylindrical neoprene sleeve 11 having a narrowed end 12 surrounds the core tube 10 at its end and is firmly bonded thereto by vulcanization. A particularly suitable neoprene composition for this purpose is made up of the following ingredients:

| | Parts by weight |
|---|---|
| Neoprene (polychloroprene) | 100 |
| Magnesium oxide | 4 |
| Dixie clay | 40 |
| Zinc oxide | 30 |
| Dibutyl ammonium oleate | 2 |
| Furnace carbon black | 2 |
| Cottonseed oil | 2 |
| Vulcanized vegetable oil | 5 |
| Phenyl β naphthylamine | 2 |

Beyond the end of the core tube 10, the polyethylene insulating layer 2 is surrounded by a cylindrical tube made up of a neoprene section 13 bonded to a polyethylene section 14 by means of a single intermediate section 15 of a polyethylene-neoprene mixture containing carbon black.

The neoprene section 13 may be formed of any conventional neoprene composition of which a typical example is the neoprene compound given above for the sleeve 11.

The neoprene section 13 has an end portion 17 which is of larger internal diameter than the remainder of the section and which slips over and snugly fits the narrowed end 12 of the neoprene sleeve 11. The neoprene section 13 may desirably have a length of the order of fifteen times its internal diameter.

The composite cylindrical tube is formed, prior to being slipped over the polyethylene insulating covering 2, by placing in a suitable cylindrical mold a portion of polyethylene tubing and an appropriate amount of an unvulcanized neoprene composition, such as that given above, with a suitable amount of a polyethylene-neoprene-carbon black mixture between the two. The mass is then heated to a temperature sufficient to vulcanize the neoprene composition, so as to form the fully vulcanized neoprene section 13, which is firmly bonded by a vulcanized bond to the intermediate bonding section 15, which is in turn firmly bonded to the polyethylene section 14.

Best results are obtained when the intermediate bonding composition consists of 60 parts by weight of polyethylene, 40 parts by weight of neoprene and 10 parts by weight of carbon block. A good bond can be obtained with neoprene contents between 30 per cent and 50 per cent by weight of the total polyethylene and neoprene. Good bonds can be obtained when the carbon black is present in amounts between 3 per cent and 50 per cent, and preferably between 5 per cent and 20 per cent, by weight of the total polyethylene and neoprene.

As indicated, the beneficial effects of the carbon black in the bonding composition can be obtained only with the proper carbon black and with the proper compounding of the composition. It has been found that only those carbon blacks which impart an acid pH to water in which they are leached are capable of improving the bond between the vulcanizable rubber composition and the bonding mixture. In general, impingement blacks or carbon blacks which are produced by the impingement of a burning hydrocarbon gas or vapor on a surface are acid carbon blacks. Such carbon blacks are commonly referred to as channel blacks.

Carbon blacks which are produced by the cracking or combustion of hydrocarbons in free space, the so-called furnace blacks or thermal blacks, do not improve the bonding power of the polyethylene-rubber mixtures.

Although improvement in bonding is obtained with acid carbon blacks regardless of their particle size, the improvement in bonding increases as the particle size of the black decreases. Thus, substantial improvement in bonding is obtained by the addition of a channel black having an average particle diameter of 30 to 35 millimicrons; greater improvement is obtained with a channel black having an average particle size of 10 to 20 millimicrons; and far superior improvement is obtained with a channel black having an average particle size of about 5 millimicrons.

The improvement in bonding due to the presence of carbon black is not obtained if the black is milled into the neoprene or other rubber before it comes into contact with the polyethylene. The full beneficial effect of the carbon black is obtained if the black is thoroughly milled into the polyethylene and the polyethylene-carbon black mixture is then mixed with the rubber. A part of the beneficial effect is obtained if the black is milled into a mixture of polyethylene and the rubber. The effect is completely lost if the black is first milled into the rubber and the rubber-carbon black mixture is then mixed with the polyethylene.

Referring again to Fig. 2, beyond the composite tube 13, 14, 15, a sleeve 16 of polyethylene surrounds the polyethylene insulating layer 2 and is heat bonded thereto. In forming the seal, the composite tube is slipped along the outside of the polyethylene insulating layer 2 until the edge of the section 14 is in contact with the polyethylene sleeve 16. The core tube 10, surrounded by the neoprene sleeve 11 is then slipped along the cable until the narrowed end 12 of the sleeve is completely within the end portion 17 of the neoprene section 13 of the composite tube. The polyethylene section 14 is then bonded to the polyethylene sleeve 16 and to the polyethylene insulating layer 2 by the application of heat. At the same time, the polyethylene sleeve 16 is heat bonded to the insulating layer 2.

The end portion 17 of the neoprene section 13 is bonded to the narrowed end 12 of the sleeve 11 by rolling back the end portion 17 over the section 13, applying a low temperature vulcanizing neoprene cement to the outer surface of the narrowed end 12, rolling the end portion 17 to its original position in contact with the narrowed end 12 and heating the assembly until a vulcanized bond is formed between the outer surface of the narrowed end 12 and the inner surface of the end portion 17.

In the complete seal, the copper core tube 10 is bonded to the neoprene sleeve 11 by vulcanization; the neoprene sleeve 11 is bonded to the neoprene section 13 by a vulcanized neoprene cement; the neoprene section 13 is bonded to the polyethylene section 14 by the intermediate polyethylene-neoprene-carbon black bonding composition 15; and the polyethylene section 14 is heat bonded to the polyethylene insulating layer 2.

In the description above, the polyethylene-to-rubber bond without carbon black has been described as carried out with natural rubber and the bond using carbon black has been described as carried out with neoprene. However, either type of bond can be accomplished with any vulcanizable natural or synthetic rubber, such as neoprene, butadiene 1,3-styrene copolymer rubber, or butadiene 1,3-acrylonitrile copolymer rubber. Although it is preferable that the rubber used in the polyethylene-rubber bonding compositions, with or without carbon black, be the same as the rubber used in the rubber composition being bonded, this is not essential. Satisfactory bonds to any vulcanizable rubber composition can be obtained using any rubber in the bonding mixture.

The invention has been described above in terms of its specific embodiments and, since certain modifications and equivalents may be apparent to those skilled in the art, this description is intended to be illustrative of but not necessarily to constitute a limitation upon the scope of the invention.

What is claimed is:

1. A body of polyethylene bonded to a body of a vulcanized rubber composition by means of at least one intermediate layer of a mixture of polyethylene and a rubber containing an acid carbon black.

2. An article comprising a body of a vulcanized rubber composition and a body of polyethylene spaced from one another by at least one body of a bonding mixture containing a rubber, polyethylene and at least 3 per cent of an acid carbon black based on the total weight of rubber and polyethylene, said bonding mixture having been prepared by a mixing procedure in which the carbon black is not mixed with the rubber prior to its mixture with the polyethylene, the rubber body being vulcanized to the body of bonding mixture adjacent to it, the polyethylene being autogenously heat bonded to the body of bonding mixture adjacent to it, the body of bonding mixture adjacent to the vulcanized rubber body containing a rubber in an amount of at least 30 per cent by weight of the rubber and polyethylene present, the body of bonding mixture adjacent to the polyethylene body containing polyethylene in an amount of at least 50 per cent by weight of the rubber and polyethylene present.

3. An article comprising a body of a vulcanized rubber composition and a body of polyethylene spaced from one another by at least three successive, contacting, bonding layers each of which is formed of a mixture of polyethylene, rubber and up to 50 per cent of an acid carbon black based on the combined weight of the polyethylene and rubber present, said mixture having been formed by a mixing procedure in which the carbon black is not mixed with the rubber prior to its mixture with the polyethylene, the rubber composition being vulcanized to the bonding layer adjacent to it, the body of polyethylene and each of the bonding layers being autogenously heat bonded to the bonding layers adjacent to it, the bonding layer adjacent to the vulcanized rubber body containing a rubber in an amount of at least 55 per cent by weight of the polyethylene and rubber, the bonding layer adjacent to the polyethylene body containing polyethylene in an amount of at least 50 per cent by weight of the polyethylene and rubber, each of the bonding layers having a polyethylene content and a rubber content which differs by not more than 15 per cent from that of any layer to which it is directly bonded.

4. An article comprising a body of a vulcanized rubber composition and a body of polyethylene spaced from one another by at least three successive, contacting, bonding layers each of which is formed of a mixture comprising polyethylene and a rubber, the rubber composition being vulcanized to the bonding layer adjacent to it, the body of polyethylene and each of the bonding layers being autogenously heat bonded to the bonding layers adjacent to it, the bonding layer adjacent to the vulcanized rubber body containing a rubber in an amount of at least 55 per cent by weight of the polyethylene and rubber present, the bonding layer adjacent to the polyethylene body containing polyethylene in an amount of at least 50 per cent by weight of the polyethylene and rubber present, each of the bonding layers having a polyethylene content and a rubber content which differs by not more than 15 per cent from that of any layer to which it is directly bonded.

5. An article as defined in claim 4 wherein each of the bonding layers is formed of a mixture consisting of polyethylene and a rubber containing between 3 per cent and 50 per cent of an acid carbon black based on the combined weight of the polyethylene and rubber, said mixture having been prepared by a mixing procedure in which the carbon black is mixed with the polyethylene before it is mixed with the rubber.

6. An article as defined in claim 4 wherein each of the bonding layers is formed of a mixture consisting of polyethylene and a rubber.

7. An article comprising a body of a natural rubber composition, containing a vulcanizing agent and vulcanized to a first bonding layer consisting of 60 per cent by weight of natural rubber and 40 per cent by weight of polyethylene, which first bonding layer is autogenously heat bonded to a second bonding layer consisting of equal parts by weight of natural rubber and polyethylene, which second bonding layer is autogenously heat bonded to a third bonding layer consisting of 40 per cent by weight of natural rubber and 60 per cent by weight of polyethylene, which third bonding layer is autogenously heat bonded to a fourth bonding layer consisting of 30 per cent by weight of natural rubber and 70 per cent by weight of polyethylene, which fourth bonding layer is autogenously heat bonded to a body of polyethylene.

8. An article comprising a body of a vulcanized rubber composition and a body of polyethylene bonded together by an intermediate body made up of a bonding composition comprising polyethylene, a rubber, and an acid carbon black, the rubber being present in said bonding composition in an amount between 30 per cent and 50 per cent of the combined weight of the rubber and polyethylene, the carbon black being present in an amount between 3 per cent and 50 per cent of the combined weight of the rubber and polyethylene in said bonding composition, said bonding composition being one prepared by a mixing procedure in which the carbon black is intimately mixed with the polyethylene before the rubber is added to the mixture, said bonding composition being bonded to said vulcanized rubber composition by a vulcanized bond and being heat bonded to said body of polyethylene.

9. An article as described in claim 8 wherein the bonding composition consists of polyethylene, between 50 per cent and 70 per cent of a rubber based on the combined weight of rubber and polyethylene in the composition, and carbon black in an amount between 5 per cent and 20 per cent based on the combined weight of rubber and polyethylene.

10. An article as described in claim 9 wherein the amount of carbon black in the bonding composition is about 10 per cent by weight of the combined polyethylene and rubber.

11. An article as described in claim 10 wherein the vulcanized rubber composition is a vulcanized neoprene composition, the rubber in the bonding composition is neoprene which is present in an amount of 40 per cent of the combined weight of neoprene and polyethylene, and the particle size of the carbon black is of the order of 5 millimicrons.

12. An article containing a strong, permanent, water-resistant seal between a polyethylene body and a metal body, said article comprising said metal body and said polyethylene body positioned in spaced relationship, a body of vulcanized rubber composition vulcanized to said metal body, at least three successive, contacting, bonding layers positioned between said vulcanized rubber body and said polyethylene body, each of said bonding layers consisting of polyethylene and a rubber, the vulcanized rubber body being vulcanized to the bonding layer adjacent to it, the polyethylene body and each of the bonding layers being heat bonded to the bonding layers adjacent to it, the bonding layer adjacent to the vulcanized rubber body containing a rubber in an amount of at least 55 per cent by weight, the bonding layer adjacent to the polyethylene body containing polyethylene in an amount of at least 50 per cent by weight, each of the bonding layers having a polyethylene content and a rubber content which differs by not more than 15 per cent from that of any other layer to which it is directly bonded.

13. An article as described in claim 12 wherein the metal body is formed of brass, wherein the rubber in the vulcanized rubber body and in the bonding layers is natural rubber and wherein there are four bonding layers disposed between the vulcanized rubber body and the polyethylene body, the first layer adjacent to the vulcanized rubber body being formed of 60 per cent by weight of natural rubber and 40 per cent by weight of polyethylene, the second layer adjacent to the first layer being formed of equal parts by weight of natural rubber and polyethylene, the third layer adjacent to the second layer being formed of 40 per cent by weight of natural rubber and 60 per cent by weight of polyethylene, and the fourth layer disposed between the third layer and the polyethylene body being formed of 30 per cent by weight of natural rubber and 70 per cent by weight of polyethylene.

14. An article containing a strong, permanent water-resistant seal between a polyethylene body and a metal body, said article comprising said metal body and said polyethylene body positioned in spaced relationship, a body of a vulcanized rubber composition vulcanized to said metal body, a body of a bonding composition positioned between said vulcanized rubber body and said polyethylene body, said bonding composition comprising polyethylene, a rubber in an amount between 30 per cent and 50 per cent of the combined weight of the polyethylene and rubber, and an acid carbon black in an amount between 3 per cent and 50 per cent of the combined weight of the polyethylene and rubber, said bonding composition being one prepared by a mixing procedure in which the carbon black is intimately mixed with the polyethylene before the rubber is added to the mixture, said body of bonding composition being bonded to said vulcanized rubber body by a vulcanized bond and being heat bonded to said polyethylene body.

15. An article as described in claim 14 wherein the metal body is formed of copper, wherein the rubber in the vulcanized rubber body and in the bonding composition is neoprene, and wherein the bonding composition consists of sixty parts by weight of polyethylene, forty parts by weight of neoprene and ten parts by weight of channel black having an average particle size of the order of 5 millimicrons.

16. The method of forming a strong, permanent, water-resistant seal between a vulcanized rubber body and a polyethylene body comprising bringing a body of a rubber composition containing a vulcanizing agent into contact with a first body of a bonding composition consisting of polyethylene and at least 55 per cent by weight of a rubber, vulcanizing said rubber body in contact with said bonding composition, placing at least two additional bodies of a bonding composition in successive arrangement between said first body of bonding composition and a polyethylene body, all of said bonding compositions consisting of polyethylene and rubber, the composition adjacent to said polyethylene body containing at least 50 per cent by weight of polyethylene, each of the bonding compositions having a polyethylene and a rubber content which differs by not more than 15 per cent from that of any other bonding composition with which it is in contact, and heat sealing the polyethylene body and the bonding compositions to each of the other bonding compositions with which it is in contact.

17. The method as defined in claim 16 wherein the rubber in the vulcanized rubber composition and in the bonding compositions is natural rubber, and wherein there are four bodies of bonding composition disposed between the vulcanized rubber body and the polyethylene body, the first bonding body adjacent to the vulcanized rubber body being formed of 60 per cent by weight of natural rubber and 40 per cent by weight of polyethylene, the second body adjacent to the first body being formed of equal parts by weight of rubber and polyethylene, the third body adjacent to the second body being formed of 40 per cent by weight of rubber and 60 per cent by weight of polyethylene, and the fourth body disposed between the third body and the polyethylene body being formed of 30 per cent by weight of natural rubber and 70 per cent by weight of polyethylene.

18. The method of forming a strong, permanent, water-resistant seal between a vulcanized rubber body and a polyethylene body comprising forming a bonding composition by intimately mixing between three and fifty parts by weight of an acid carbon black with between thirty and fifty parts by weight of polyethylene and subsequently adding to the mixture between fifty and seventy parts by weight of a rubber, placing a body of said bonding composition between a polyethylene body and a body of a vulcanizable rubber composition, and heating said three bodies in contact until the vulcanizable rubber composition has vulcanized and formed a vulcanized bond with said bonding composition and said polyethylene body has formed an autogenous bond with said bonding composition.

19. The method as described in claim 18 wherein the rubber in the vulcanizable rubber composition and in the bonding composition is neoprene and wherein the bonding composition consists of sixty parts by weight of polyethylene, forty parts by weight of neoprene and ten parts by weight of an acid carbon black having an average particle size of the order of 5 millimicrons.

HENRY PETERS.

References Cited in the file of this patent

UNITED STATES PATENTS

| Number | Name | Date |
|---|---|---|
| 2,028,712 | Swan et al. | Jan. 21, 1936 |
| 2,181,188 | Kemp et al. | Nov. 28, 1939 |
| 2,340,452 | Child et al. | Feb. 1, 1944 |
| 2,427,197 | Cox | Sept. 9, 1947 |
| 2,462,977 | Kitchin et al. | Mar. 1, 1949 |
| 2,541,498 | Calvert | Feb. 13, 1951 |
| 2,569,540 | Selby | Oct. 2, 1951 |
| 2,576,227 | Hutchins | Nov. 27, 1951 |